United States Patent
Park et al.

(10) Patent No.: US 10,548,801 B2
(45) Date of Patent: Feb. 4, 2020

(54) MOTION ASSISTANCE APPARATUS

(71) Applicant: Samsung Electronics Co., Ltd., Suwon-si, Gyeonggi-do (KR)

(72) Inventors: Youngjin Park, Seoul (KR); Keehong Seo, Seoul (KR); Bokman Lim, Yongin-si (KR); Seungyong Hyung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 270 days.

(21) Appl. No.: 15/634,332

(22) Filed: Jun. 27, 2017

(65) Prior Publication Data

US 2018/0228684 A1     Aug. 16, 2018

(30) Foreign Application Priority Data

Feb. 16, 2017    (KR) ........................ 10-2017-0020870

(51) Int. Cl.
     *A61H 3/00*          (2006.01)

(52) U.S. Cl.
     CPC ........ *A61H 3/00* (2013.01); *A61H 2201/1207* (2013.01); *A61H 2201/5007* (2013.01);
(Continued)

(58) Field of Classification Search
     CPC ............... A61H 3/00; A61H 2003/005; A61H 2003/007; A61H 2201/0165;
(Continued)

(56) References Cited

U.S. PATENT DOCUMENTS 6,532,400 B1 *   3/2003   Jacobs ................... B25J 9/1075
                                                 318/568.11
9,060,883 B2 *   6/2015   Herr .......................... A61F 2/66
(Continued)

FOREIGN PATENT DOCUMENTS

JP          2010110543 A      5/2010
KR        101315199 B1     10/2013
(Continued)

OTHER PUBLICATIONS

Extended European Search Report dated Dec. 4, 2018, for corresponding EP Application No. 17205343.1.
(Continued)

*Primary Examiner* — Alvin J Stewart
(74) *Attorney, Agent, or Firm* — Harness, Dickey and Pierce, P.L.C.

(57) ABSTRACT

A motion assistance apparatus including a proximal support configured to support a proximal part of a user, a distal support configured to support a distal part of the user, a support assembly configured to connect the proximal support and the distal support and adjust a separation distance between the proximal support and the distal support and a rotation angle of the distal support, and a controller configured to control the support assembly based on a virtual dual spring-mass model designed using the proximal support as a body of mass, the controller including a first virtual spring configured to connect the proximal support and a first portion of the distal support and a second virtual spring configured to connect the proximal support and a second portion of the distal support is disclosed.

25 Claims, 14 Drawing Sheets

(52) U.S. Cl.
CPC ............... *A61H 2201/5061* (2013.01); *A61H 2201/5064* (2013.01); *A61H 2201/5079* (2013.01)

(58) Field of Classification Search
CPC ............ A61H 2201/1207; A61H 3/008; A61H 1/0237; A61H 1/0224; A61H 1/0244; A61H 1/0262; B25J 9/0006; F15B 15/088
See application file for complete search history.

(56) References Cited

U.S. PATENT DOCUMENTS

| | | | | |
|---|---|---|---|---|
| 9,539,117 | B2* | 1/2017 | Herr | A61F 2/66 |
| 9,687,377 | B2* | 6/2017 | Han | A61F 5/0125 |
| 9,737,419 | B2* | 8/2017 | Herr | A61F 5/0111 |
| 2007/0123997 | A1* | 5/2007 | Herr | A61F 2/60 |
| | | | | 623/27 |
| 2007/0162152 | A1* | 7/2007 | Herr | A61F 2/60 |
| | | | | 623/24 |
| 2008/0249438 | A1* | 10/2008 | Agrawal | A61H 1/0237 |
| | | | | 601/35 |
| 2010/0113980 | A1* | 5/2010 | Herr | A61F 2/60 |
| | | | | 600/587 |
| 2010/0114329 | A1* | 5/2010 | Casler | B25J 19/0008 |
| | | | | 623/24 |
| 2010/0312363 | A1* | 12/2010 | Herr | A61F 2/64 |
| | | | | 623/39 |
| 2010/0324699 | A1* | 12/2010 | Herr | A61F 2/66 |
| | | | | 623/27 |
| 2011/0257764 | A1* | 10/2011 | Herr | A61F 2/60 |
| | | | | 623/24 |
| 2011/0306907 | A1 | 12/2011 | Ashihara et al. | |
| 2012/0158181 | A1* | 6/2012 | Seo | B62D 57/032 |
| | | | | 700/261 |
| 2013/0310979 | A1* | 11/2013 | Herr | B62D 57/032 |
| | | | | 700/258 |
| 2014/0188279 | A1* | 7/2014 | Lee | B25J 9/1607 |
| | | | | 700/263 |
| 2014/0213951 | A1* | 7/2014 | Pietrusisnki | A61H 1/024 |
| | | | | 602/23 |
| 2014/0296997 | A1* | 10/2014 | Herr | A61F 5/0111 |
| | | | | 623/24 |
| 2015/0197008 | A1* | 7/2015 | Yoon | B25J 9/0006 |
| | | | | 700/250 |
| 2015/0313786 | A1 | 11/2015 | Sano | |
| 2016/0347387 | A1* | 12/2016 | Hurst | B62D 57/032 |
| 2016/0374887 | A1* | 12/2016 | Wu | A61F 5/0123 |
| | | | | 623/31 |
| 2017/0198728 | A1* | 7/2017 | Noda | B25J 11/00 |
| 2017/0360644 | A1* | 12/2017 | Hyun | A43B 3/0005 |
| 2018/0147073 | A1* | 5/2018 | Ly | A61F 2/644 |
| 2018/0177668 | A1* | 6/2018 | Park | A61H 1/024 |
| 2018/0228684 | A1* | 8/2018 | Park | A61H 3/00 |
| 2019/0096064 | A1* | 3/2019 | Yang | G06T 7/11 |

FOREIGN PATENT DOCUMENTS

| | | |
|---|---|---|
| KR | 10-1486808 B1 | 1/2015 |
| WO | WO-2004/019832 A1 | 3/2004 |
| WO | WO-2015/032696 A1 | 3/2015 |

OTHER PUBLICATIONS

Samuel Au et al: "Powered ankle-foot prosthesis to assist level-ground and stair-descent gaits", Neural Networks, Elsevier Science Publishers, Barking, GB, vol. 21, No. 4, May 1, 2008, Special Issue?, pp. 654-666, XP022716530.

Extended European Search Report dated Dec. 4, 2018, for corresponding EP Application No. 17205343. I.

Hartmut Geyer et al. "Compliant leg behaviour explains basic dynamics of walking and running.".

Yasushi Ikeuchi et al., "Walking Assist Device with Bodyweight Support System", the 2009 IEEE/RSJ International Conference on Intelligent Robots and Systems, pp. 4073-4079, Oct. 11-15, 2009, St. Louis, USA.

Yun-Pyo Hong et al., "The SoftGait: A Simple and Powerful Weight-Support Device for Walking and Squatting", 2015 IEEE/RSJ International Conference on Intelligent Robots and Systems (IROS), Congress Center Hamburg, pp. 6336-6341, Sep. 28-Oct. 2, 2015, Hamburg, Germany.

* cited by examiner

FIG. 4
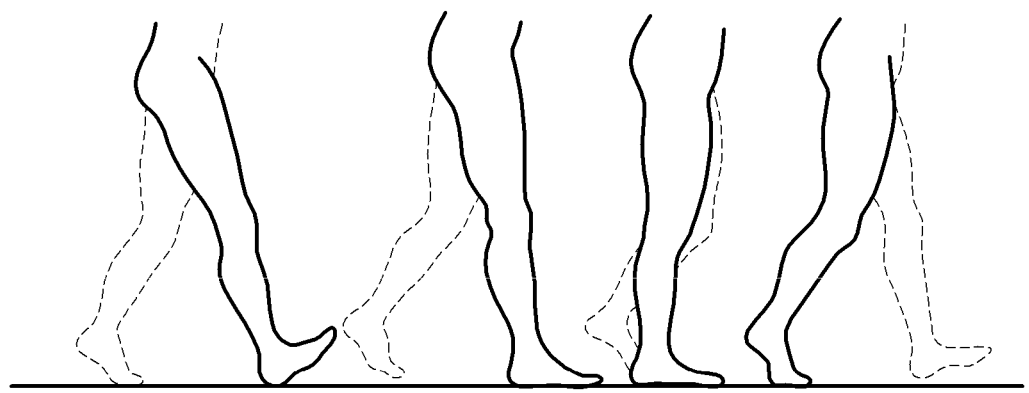
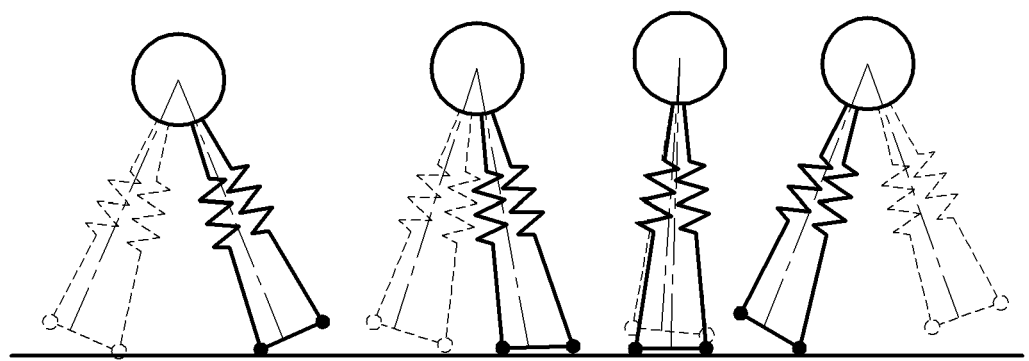

4

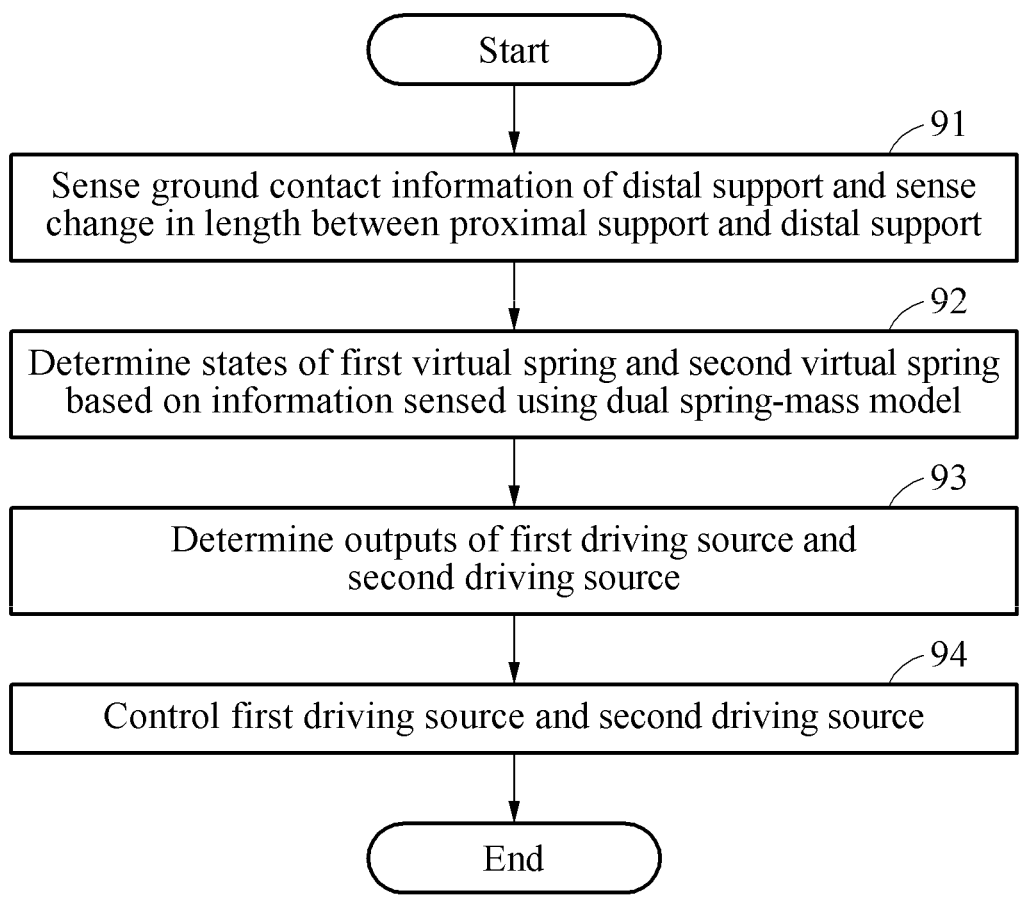

MOTION ASSISTANCE APPARATUS

CROSS-REFERENCE TO RELATED APPLICATION

This application claims under 35 U.S.C. § 119 to Korean Patent Application No. 10-2017-0020870, filed on Feb. 16, 2017, in the Korean Intellectual Property Office, the entire contents of which are incorporated herein by reference in their entirety.

BACKGROUND

1. Field

At least one example embodiment relates to a locking device and/or a motion assistance apparatus including same.

2. Description of the Related Art

Motion assistance apparatuses enabling the elderly and/or patients having joint problems to walk with less effort, and motion assistance apparatuses increasing muscular strength of users for military purposes are being developed.

SUMMARY

Some example embodiments relate to a motion assistance apparatus.

In some example embodiments, the motion assistance apparatus includes a proximal support configured to support a proximal part of a user; a distal support configured to support a distal part of the user, the distal support including a first portion and a second portion; a support assembly configured to connect the proximal support and the distal support, to adjust a separation distance between the proximal support and the distal support, and to adjust a rotation angle of the distal support; and a controller configured to control the support assembly based on a virtual dual spring-mass model designed using the proximal support as a body of mass, the virtual dual spring-mass model including a first virtual spring virtually connecting the proximal support and the first portion of the distal support and a second virtual spring virtually connecting the proximal support and the second portion of the distal support.

In some example embodiments, the first portion and the second portion of the distal support are on opposite sides of the distal support with respect to a center of rotation of the distal support.

In some example embodiments, at least two joints are between the proximal part and the distal part of the user.

In some example embodiments, the controller is configured to drive the support assembly based on a modulus of elasticity of the first virtual spring, a change in length of the first virtual spring, a modulus of elasticity of the second virtual spring, and a change in length of the second virtual spring.

In some example embodiments, the controller is configured to, determine a first virtual force applied from the first virtual spring to the first portion of the distal support, determine a second virtual force applied from the second virtual spring to the second portion of the distal support, and drive the support assembly based on the first virtual force and the second virtual force.

In some example embodiments, the controller is configured to adjust a modulus of elasticity of the first virtual spring and a modulus of elasticity of the second virtual spring.

In some example embodiments, the controller is configured to increase the modulus of elasticity of the first virtual spring when the first portion of the distal support contacts a ground.

In some example embodiments, the controller is configured to reduce the modulus of elasticity of the first virtual spring when the first portion of the distal support separates from a ground.

In some example embodiments, the motion assistance apparatus further includes a support sensor configured to sense whether one or more of the first portion and the second portion of the distal support contacts the ground, wherein the controller is configured to adjust one or more of the modulus of elasticity of the first virtual spring and the modulus of elasticity of the second virtual spring based on one or more signals from the support sensor.

In some example embodiments, the support sensor includes: a first contact sensor configured to transfer a first signal to the controller based on whether the first portion of the distal support contacts the ground; and a second contact sensor configured to transfer a second signal to the controller based on whether the second portion of the distal support contacts the ground.

In some example embodiments, the controller is configured to, set the modulus of elasticity of the first virtual spring to a value greater than the modulus of elasticity of the second virtual spring when the first contact sensor is on and the second contact sensor is off, and set the modulus of elasticity of the second virtual spring to a value greater than the modulus of elasticity of the first virtual spring when the second contact sensor is on and the first contact sensor is off.

In some example embodiments, the controller is configured to set a difference between the modulus of elasticity of the first virtual spring and the modulus of elasticity of the second virtual spring to a value less than or equal to a first set value, when both the first contact sensor and the second contact sensor are on.

In some example embodiments, the controller is configured to set each of the modulus of elasticity of the first virtual spring and the modulus of elasticity of the second virtual spring to a value less than a second set value, when both the first contact sensor and the second contact sensor are off.

In some example embodiments, the support sensor includes a pressure sensor configured to measure information on a distribution of pressure applied from the ground to the distal support, and the controller is configured to adjust values of the modulus of elasticity of the first virtual spring and the modulus of elasticity of the second virtual spring or a ratio between the modulus of elasticity of the first virtual spring and the modulus of elasticity of the second virtual spring based on the measured information.

In some example embodiments, the motion assistance apparatus further includes a speed sensor configured to sense a walking speed of the user, wherein the controller is configured to, increase at least one of the modulus of elasticity of the first virtual spring and the modulus of elasticity of the second virtual spring when the walking speed increases, and reduce at least one of the modulus of elasticity of the first virtual spring and the modulus of elasticity of the second virtual spring when the walking speed decreases.

In some example embodiments, the virtual dual spring-mass model includes at least one of a first virtual damper and a second virtual damper, the first virtual damper connecting the proximal support and the first portion of the distal support, and the second virtual damper connecting the proximal support and the second portion of the distal support, and the controller is configured to control the support assembly based on a virtual damping force of the first virtual damper or the second virtual damper.

In some example embodiments, the support assembly includes a plurality of rotatable links.

In some example embodiments, the plurality of rotatable links includes a first link and a second link, the first link rotatably connected to the proximal support, and the second link rotatably connected to the first link and the distal support, and the support assembly includes a first driving source and a second driving source, the first driving source configured to adjust a rotation angle between the proximal support and the first link or a rotation angle between the first link and the second link, and the second driving source configured to adjust a rotation angle between the second link and the distal support.

In some example embodiments, the controller is configured to, determine a first virtual force exerted by the first virtual spring on the first portion of the distal support and a second virtual force exerted by the second virtual spring on the second portion of the distal support, and control the first driving source and the second driving source based on an output matrix calculated by multiplying an input matrix by a Jacobian transformation matrix, the input matrix including the first virtual force and the second virtual force, and the Jacobian transformation matrix determined based on a kinematic structure of the support assembly.

In some example embodiments, the support assembly further includes a third driving source configured to adjust the rotation angle between the first link and the second link, and the first driving source is configured to adjust the rotation angle between the proximal support and the first link.

In some example embodiments, the support assembly includes a first driving source and a second driving source to connect both sides of the distal support and the proximal support, and to provide linear power from the proximal support to both sides of the distal support.

In some example embodiments, the controller is configured to, determine a first virtual force exerted by the first virtual spring on the first portion of the distal support and a second virtual force exerted by the second virtual spring on the second portion of the distal support; and control the first driving source and the second driving source based on an output matrix calculated by multiplying an input matrix by a Jacobian transformation matrix, the input matrix including the first virtual force and the second virtual force, and the Jacobian transformation matrix determined based on a kinematic structure of the support assembly.

In some example embodiments, the support assembly further includes a damper configured to connect the proximal support and the distal support.

In some example embodiments, the proximal support is configured to support a waist of the user, and the distal support is configured to support a first foot of the user.

In some example embodiments, the motion assistance apparatus further includes an additional distal support configured to support a second foot of the user; and an additional support assembly configured to connect the proximal support and the additional distal support, and to adjust a separation distance from the proximal support to the additional distal support and a rotation angle of the additional distal support.

In some example embodiments, the controller is configured to control the support assembly based on a virtual dual spring-mass model designed using the proximal support as a body of mass, the virtual dual spring-mass model including a first virtual spring and a second virtual spring, the first virtual spring configured to connect the proximal support and a first portion of the distal support, and the second virtual spring configured to connect the proximal support and a second portion of the distal support.

Other embodiments relate to a control method of a motion assistance apparatus.

In some example embodiment, the motion assistance apparatus including a proximal support configured to support a proximal part of a user and a distal support configured to support a distal part of the user, and the method includes adjusting a separation distance between the proximal support and the distal support and a rotation angle of the distal support based on a virtual dual spring-mass model designed using the proximal support as a body of mass, the virtual dual spring-mass model including a first virtual spring configured to connect the proximal support and a first portion of the distal support and a second virtual spring configured to connect the proximal support and a second portion of the distal support.

Other embodiments relate to a motion assistance apparatus.

In some example embodiment, the motion assistance apparatus includes a proximal support configured to support a proximal part of a user; a distal support configured to support a distal part of the user, the distal support including a first portion and a second portion; a first spring configured to connect the proximal support and the first portion of the distal support; and a second spring configured to connect the proximal support and the second portion of the distal support, wherein at least two joints are between the proximal part and the distal part of the user.

In some example embodiment, the motion assistance apparatus further includes a damper configured to connect the proximal support and the distal support.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 4 illustrates a motion assistance apparatus operating based on a change in position at which a foot contact a ground when a user is in a stance phase according to at least one example embodiment;

FIG. 10 is a flowchart illustrating a control method of a motion assistance apparatus according to at least one example embodiment;

DETAILED DESCRIPTION

Figure 1:
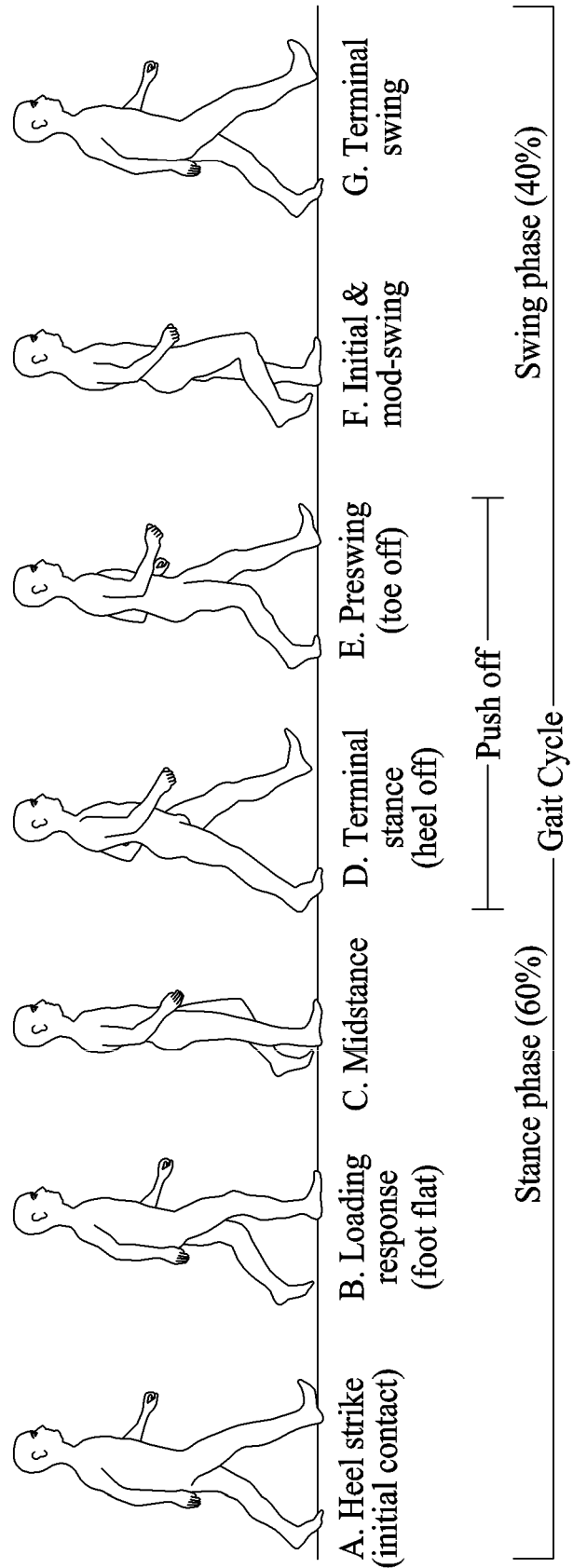
FIG. 1 illustrates a human gait cycle according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
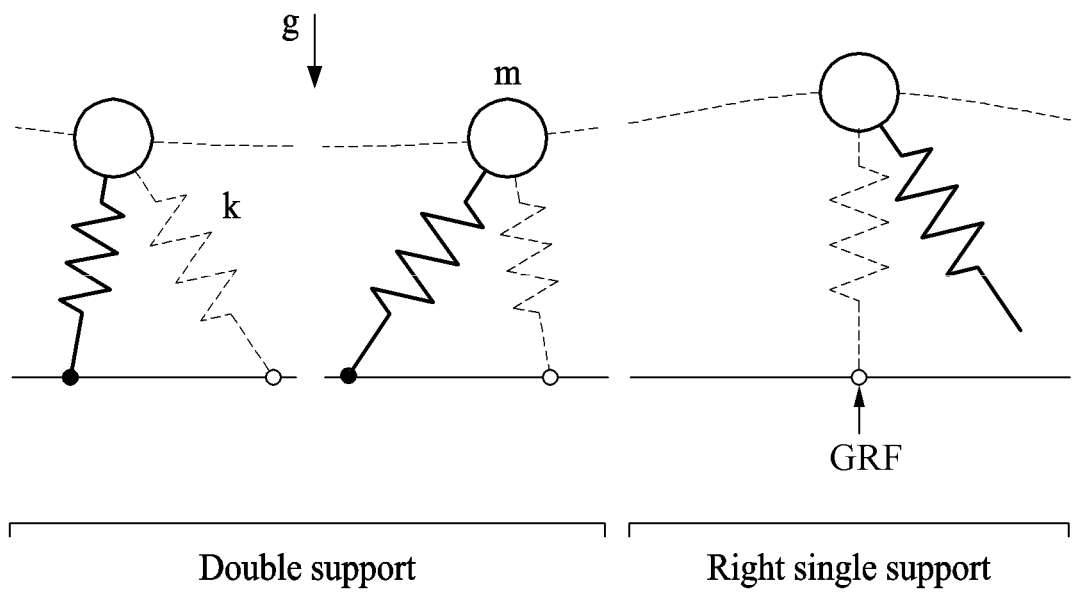
FIG. 2 illustrates a human gait based on a spring-mass model according to at least one example embodiment.

FIG. 1 illustrates a human gait cycle according to at least one example embodiment and FIG. 2 illustrates a human gait based on a spring-mass model according to at least one example embodiment.

Referring to FIG. 1, a human gait cycle may be understood that a stance phase in which a leg contacts a ground and a swing phase in which the leg is separated from the ground are repeated by turns. In a human gait, a motion of at least one joint may be performed. For example, when a person is walking, motions of a talocrural joint, a subtalr joint, a knee joint, and a hip joint may be performed simultaneously. In this example, each of the joints may have a different degree of freedom and a motion. Thus, to assist the gait following the motion of each of the joints accurately, an angle of the corresponding joint and a torque applied to the corresponding joint may need to be considered.

In the legged dynamics, both legs may be modeled to correspond to two springs in a human gait motion and a modulus of elasticity, for example, a stiffness of the leg may maintain a desired (or, alternatively, a predetermined) value of about 20 kilo newton per meter (kN/m) in a stance phase during a gait.

Referring to FIG. 2, when each leg of a person is understood as a single linear spring, a motion of the leg in a gait cycle may be simplified based on one degree of freedom. For example, a center of gravity of the person may be assumed to be located at a mass m and the leg may be assumed as a spring having a modulus of elasticity K. In a gait motion of the person, the motion of the leg may be acknowledged based on a change in straight-line distance from a portion of the leg, for example, a thigh to a ground and a change in elastic force following the change in straight-line distance.

The bipedal spring-mass model may analyze a motion of the entire leg instead of analyzing a human gait for each of a hip joint, a knee joint, and an ankle joint as in a typical research method. Even though the bipedal spring-mass model is in a simple structure, various characteristics of the human gait such as, a ground reaction force (GRF) pattern and a center of motion (COM) tracking may be effectively explained. Because a human being has a bottom of foot, a heel-strike motion and a push-off motion may occur during a gait due to the bottom of foot. However, it is difficult to analyze such phenomenon only using the bipedal spring-mass model.

Figure 3:
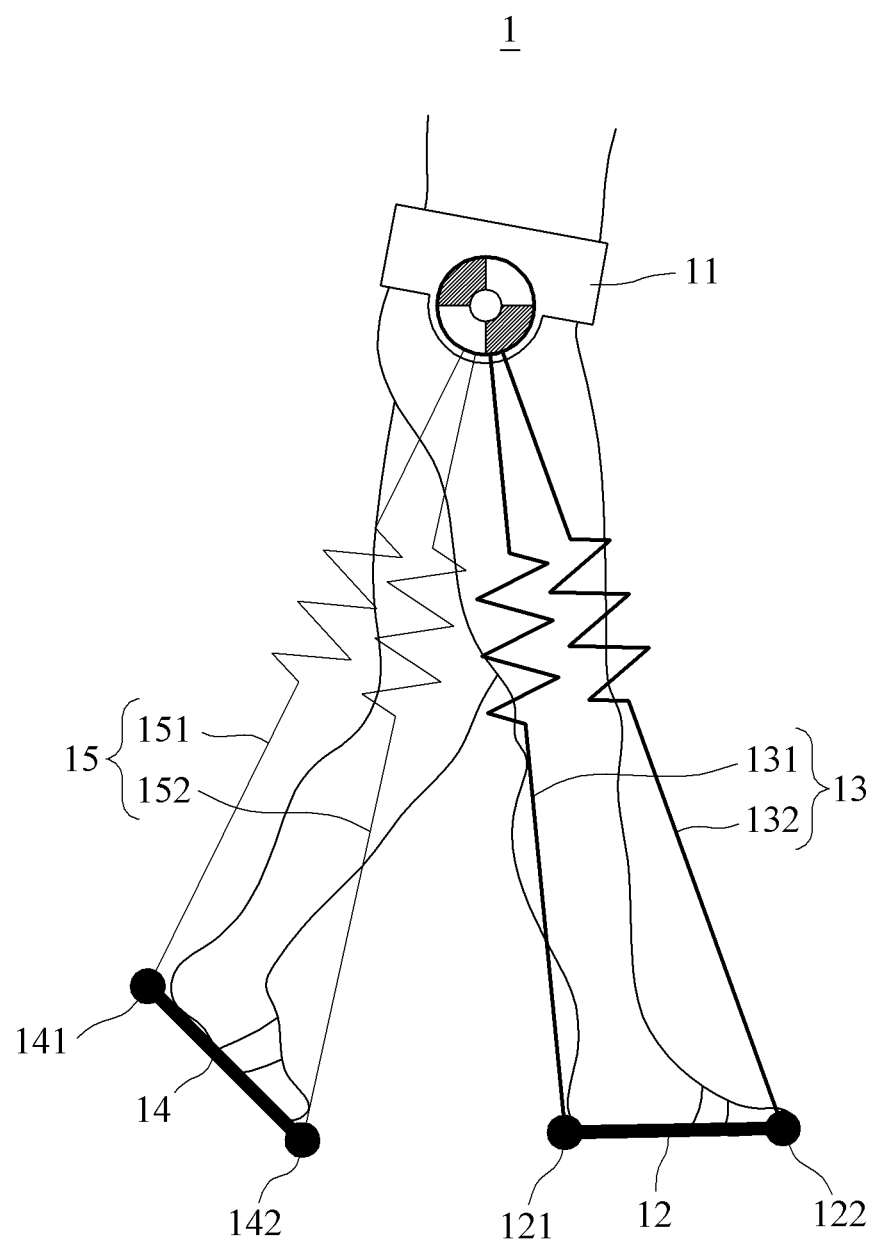
FIG. 3 illustrates a motion assistance apparatus according to at least one example embodiment.

FIG. 3 illustrates a motion assistance apparatus according to at least one example embodiment.

Figure 5:
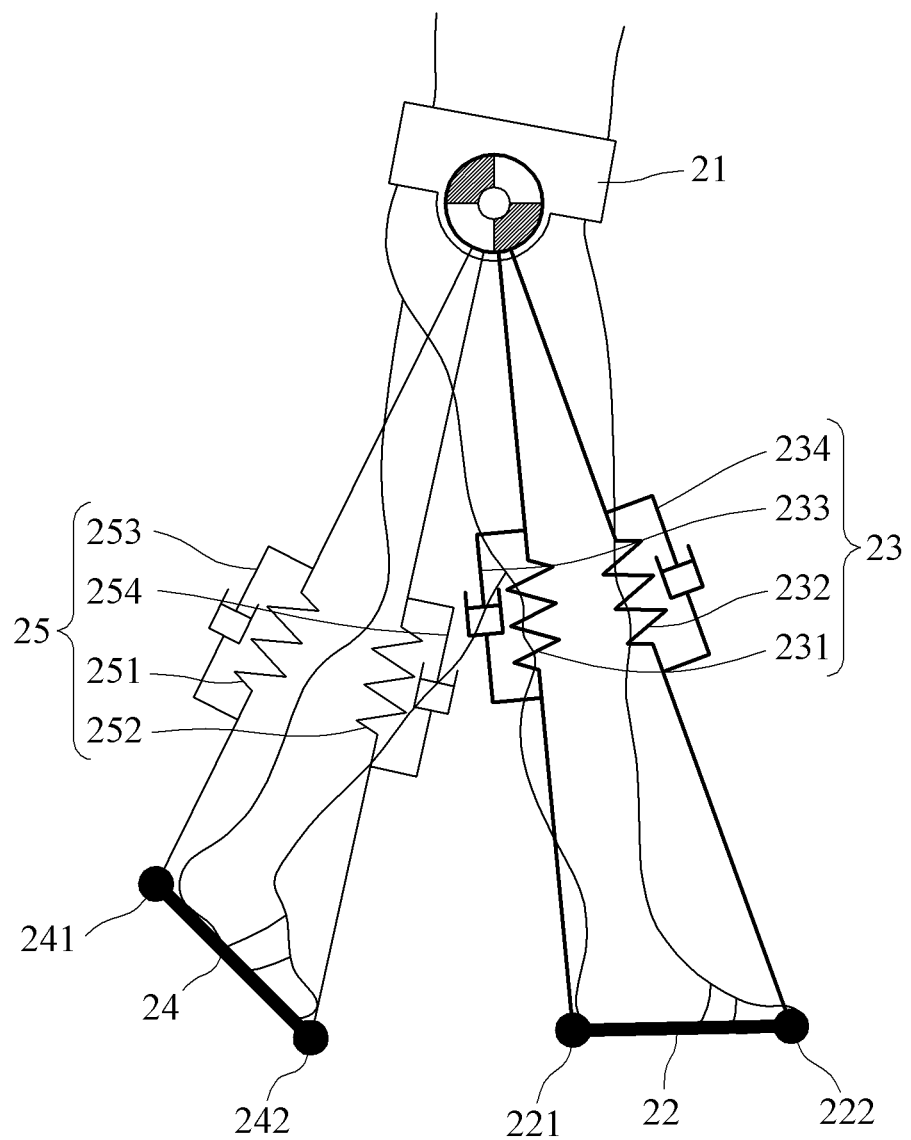
FIG. 5 illustrates a motion assistance apparatus according to at least one example embodiment.

Referring to FIG. 3, a motion assistance apparatus 1 may be worn by a user to assist a motion of the user. The user may correspond to a human, an animal, or a robot. However, the user is not limited thereto. Although FIGS. 4 and 5 illustrate a case in which the motion assistance apparatus 1 assists a gait motion of the user, the motion assistance apparatus 1 may also assist a motion of another portion of the user, for example, a wrist, an elbow, or a shoulder. For example, the motion assistance apparatus 1 may assist a motion of the user moving forward or backward while standing on upside-down. Hereinafter, an example in which the motion assistance apparatus 1 assists a gait of a human will be described.

The motion assistance apparatus 1 may be attached to a left lower limb and/or a right lower limb. The motion assistance apparatus 1 may assist one lower limb and may also assist both lower limbs. The motion assistance apparatus 1 may include a proximal support 11, a distal support 12, a support assembly 13, an additional distal support 14, and an additional support assembly 15.

The proximal support 11 may support a proximal part of a user. The proximal support 11 may support at least a portion of an upper body, a waist, or a pelvis or support a portion below a hip of the user. For example, the proximal support 11 may include a detachable belt configured to support an overall circumference of the pelvic or the waist of the user. Also, the proximal support 11 may include a saddle structure to support a thigh part of the user and a pad to increase a wearability of the user.

The distal support 12 may support a distal part of the user. The distal support 12 may support a foot. The distal support 12 may have a length corresponding to a length of the foot of the user. The distal support 12 may include a structure that covers a sole of the user overall. For example, the distal support 12 may include a detachable belt configured to encompass a top of the foot of the user so as to prevent the distal support 12 separating from the foot while the user is walking. The distal support 12 may rotate based on an ankle joint of the user. For example, the distal support 12 may follow a dorsiflexion and a plantar flexion. The distal support 12 may include a first portion 121 and a second portion 122.

The first portion 121 and the second portion 122 of the distal support 12 may be located on opposite sides based on a center of rotation of the distal support 12. For example, the first portion 121 and the second portion 122 of the distal support 12 may be located on opposite sides based on the ankle joint of the user. The first portion 121 may be a portion close to a heel of the user and the second portion 122 may be a portion close to toes of the user. An interval between the first portion 121 and the second portion 122 may be similar or identical to the length of the foot of the user.

Among joints of the user, at least two joints may be between the proximal part and the distal part. For example, the proximal part supported by the proximal support 11 may be the waist of the user and the distal part supported by the distal support 12 may be the foot of the user. In this example, a hip joint, a knee joint, and the ankle joint may be between the proximal part and the distal part. The proximal part and the distal part are not limited to the example. The proximal part may also be a portion below the hip of the user. In this example, the knee joint and the ankle joint may be between the proximal part and the distal part.

The support assembly 13 may connect the proximal support 11 and the distal support 12 and adjust a separation distance between the proximal support 11 and the distal support 12. For example, when the support assembly 13 is contracted, the separation distance between the proximal support 11 and the distal support 12 may decrease. The support assembly 13 may adjust a rotation angle of the distal support 12. For example, on a sagittal plane, the support assembly 13 may control the distal support 12 to rotate based on the proximal support 11. Also, the support assembly 13 may adjust an angle between the distal support 12 and a ground. The support assembly 13 may include a first spring 131 and a second spring 132.

The first spring 131 may connect the proximal support 11 and the first portion 121 of the distal support 12. When the user performs a heel-strike motion, the first spring 131 may apply an elastic force to the first portion 121 to absorb an impact applied to the user.

The second spring 132 may connect the proximal support 11 and the second portion 122 of the distal support 12. When the user performs a push-off motion, the second spring 132 may apply an elastic force to the second portion 122 of the distal support 12 to assist the push-off motion of the user.

The motion assistance apparatus 1 may assist a gait of the user using the elastic force of the first spring 131 and the second spring 132, thereby simplifying a structure. Because the first spring 131 and the second spring 132 respectively apply forces to the first portion 121 supporting the heel and the second portion 122 supporting the toes, a force receiving position and a center of pressure received by the user during the gait may be about the same. In the above structure, an inconvenience of the user wearing the motion assistance apparatus 1 may be reduced.

The additional distal support 14 may support a distal part that is unsupported by the distal support 12. For example, when the distal support 12 support a right foot of the user, the additional distal support 14 may support a left foot of the user.

The additional support assembly 15 may connect the proximal support 11 and the additional distal support 14 and adjust a separation distance between the proximal support 11 and the additional distal support 14. On the sagittal plane, the additional support assembly 15 may adjust an angle by which the additional distal support 14 rotates based on the proximal support 11. The additional support assembly 15 may include a first spring 151 and a second spring 152.

Unless otherwise described, the description about the distal support 12 and the support assembly 13 is also applicable to the additional distal support 14 and the additional support assembly 15 and thus, repeated description will be omitted for brevity.

FIG. 4 illustrates a motion assistance apparatus operating based on a change in position at which a foot contact a ground when a user is in a stance phase according to at least one example embodiment.

Referring to FIG. 4, it is understood that a portion of a foot of a person contacting a ground is sequentially changed in a stance phase during a gait. The stance phase may include a heel strike interval in which a heel contacts the ground, a mid-stance interval in which a sole contacts the ground, a terminal stance interval in which a forefoot contacts the ground, and a toe-off interval in which the forefoot pushes the ground off such that a person moves forward. In the stance phase, the foot may contact the ground sequentially from the heel to the forefoot. In such process, a center of pressure of the person with respect to the ground may move sequentially from the heel to the forefoot. Thus, to implement an actual gait of the person, a center of pressure of a motion assistance apparatus with respect to the ground may need to be moved sequentially from the heel to the forefoot. For example, the motion assistance apparatus may provide an assistance power to a rear portion of the foot to reduce an impact applied to the heel of the user in the heel-strike interval. Also, the motion assistance apparatus may provide an assistance power to a front portion of the foot to assist a power to be used for the push-off motion in the push-off interval.

FIG. 5 illustrates a motion assistance apparatus according to at least one example embodiment.

Referring to FIG. 5, a motion assistance apparatus 2 may include a proximal support 21, a distal support 22, a support assembly 23, an additional distal support 24, and an additional support assembly 25.

The support assembly 23 may include a first spring 231, a second spring 232, a first damper 233, and a second damper 234.

The first damper 233 and the second damper 234 may be arranged in parallel to the first spring 131 and the second spring 132, respectively. The first damper 233 may connect the proximal support 21 and a first portion 221 of the distal support 22. The second damper 234 may connect the proximal support 21 and a second portion 222 of the distal support 22.

The first damper 233 and the second damper 234 may adjust a degree to which the first spring 231 and the second spring 232 are compressed and extended based on a walking speed of the user. When the user is walking at a low speed, for example, a speed between 2.2 and 5.4 kilometers per hour (km/h), lower limbs of the user may move similarly to a spring. When the user is walking at a high speed, for example, a speed between 5.4 and 13 km/h, the lower limbs of the user may move similarly to a link that is more rigid compared to the lower limbs of the user walking at the low speed. Thus, by using the first damper 233 and the second damper 234 connected in parallel to the first spring 231 and the second spring 232, the motion assistance apparatus 2 may provide a walking assistance power suitable for a wide range of speed of the user even when the user is walking or running.

The additional support assembly 15 may include a first spring 251, a second spring 252, a first damper 253, and a second damper 254.

Figure 6:
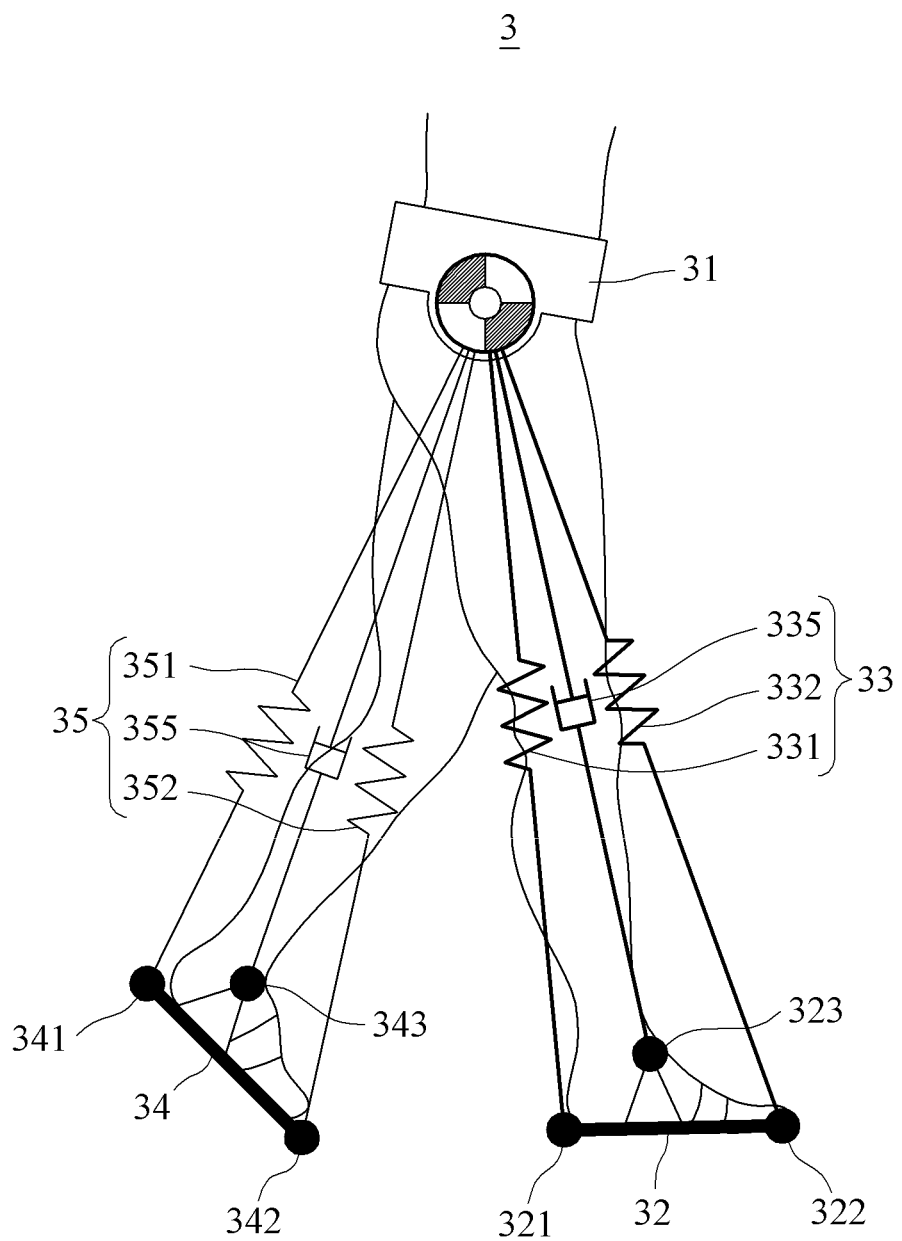
FIG. 6 illustrates a motion assistance apparatus according to at least one example embodiment.

FIG. 6 illustrates a motion assistance apparatus according to at least one example embodiment.

Referring to FIG. 6, a motion assistance apparatus 3 may include a proximal support 31, a distal support 32, a support assembly 33, an additional distal support 34, and an additional support assembly 35. The distal support 32 may include a first portion 321, a second portion 322, and a third portion 323.

The first portion 321 and the second portion 322 may be located on opposite sides based on the third portion 323. The third portion 323 may support, for example, an ankle joint of a user.

The support assembly 33 may include a first spring 331, a second spring 332, and a damper 335.

The damper 335 may connect the proximal support 31 and the third portion 323. The damper 335 may absorb an impact applied from a ground when the user performs a heel-strike motion.

Figure 7:
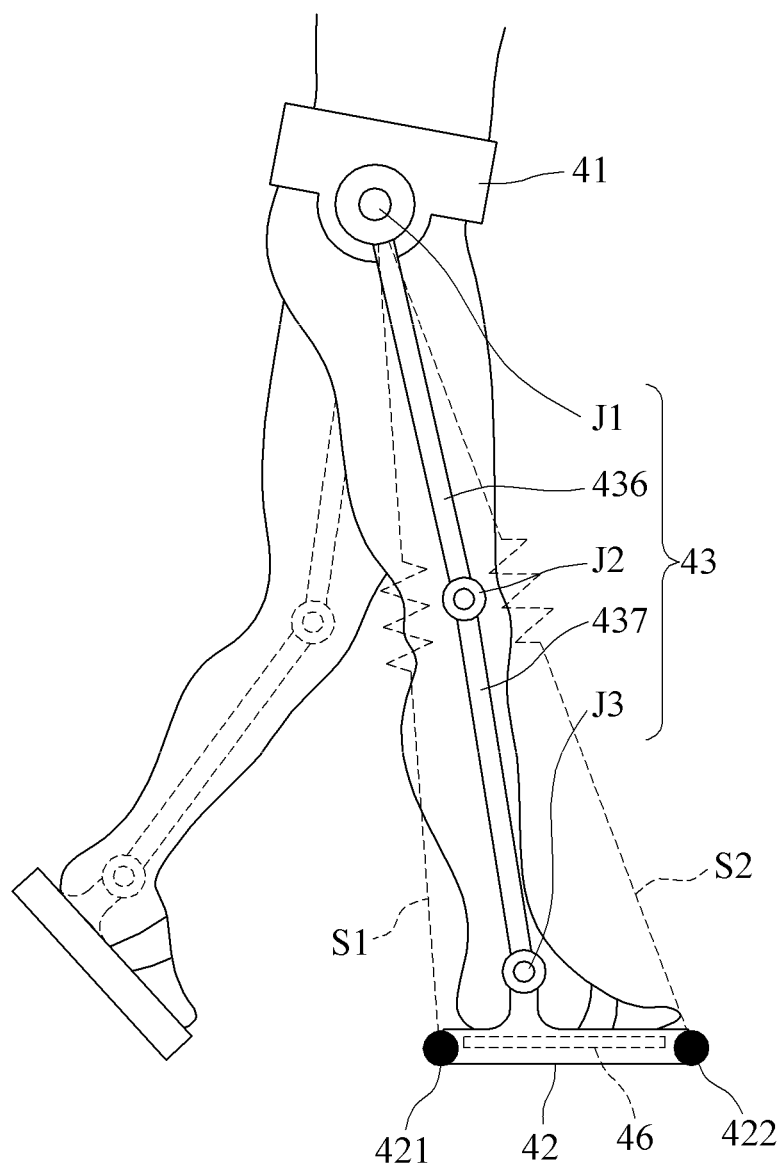
FIG. 7 illustrates a motion assistance apparatus according to at least one example embodiment.
Figure 8:
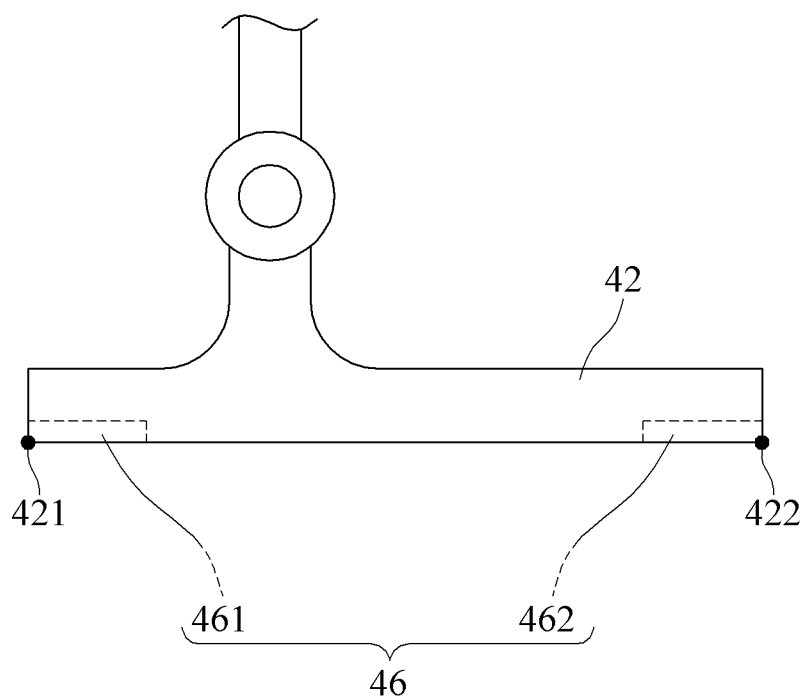
FIG. 8 illustrates a support sensor according to at least one example embodiment.
Figure 9A:
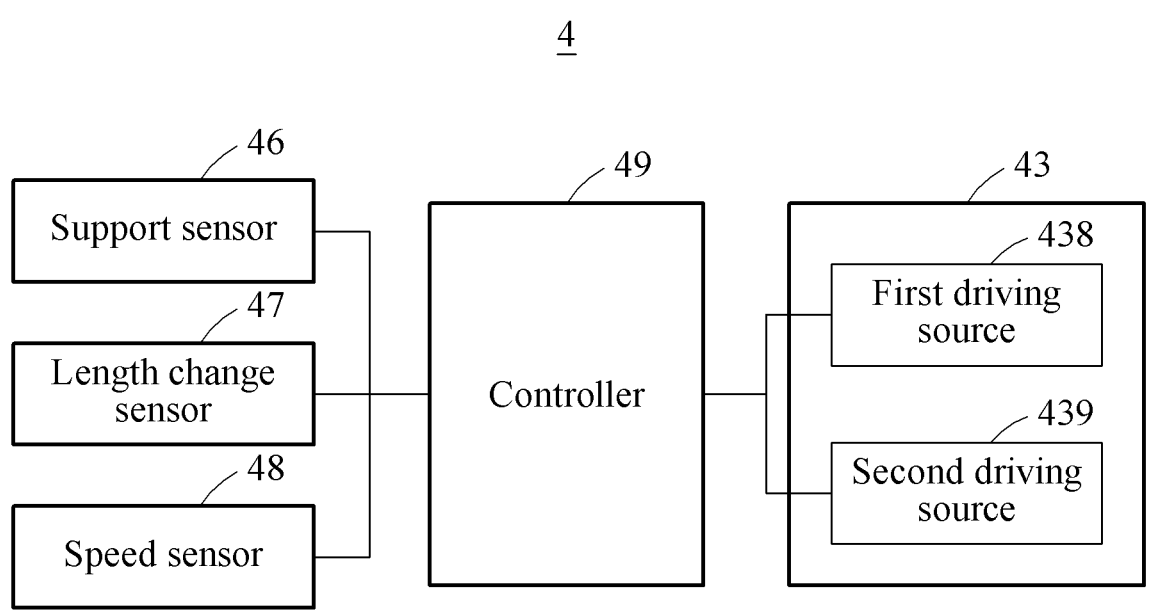
FIG. 9A is a block diagram illustrating a motion assistance apparatus according to at least one example embodiment.
Figure 9B:
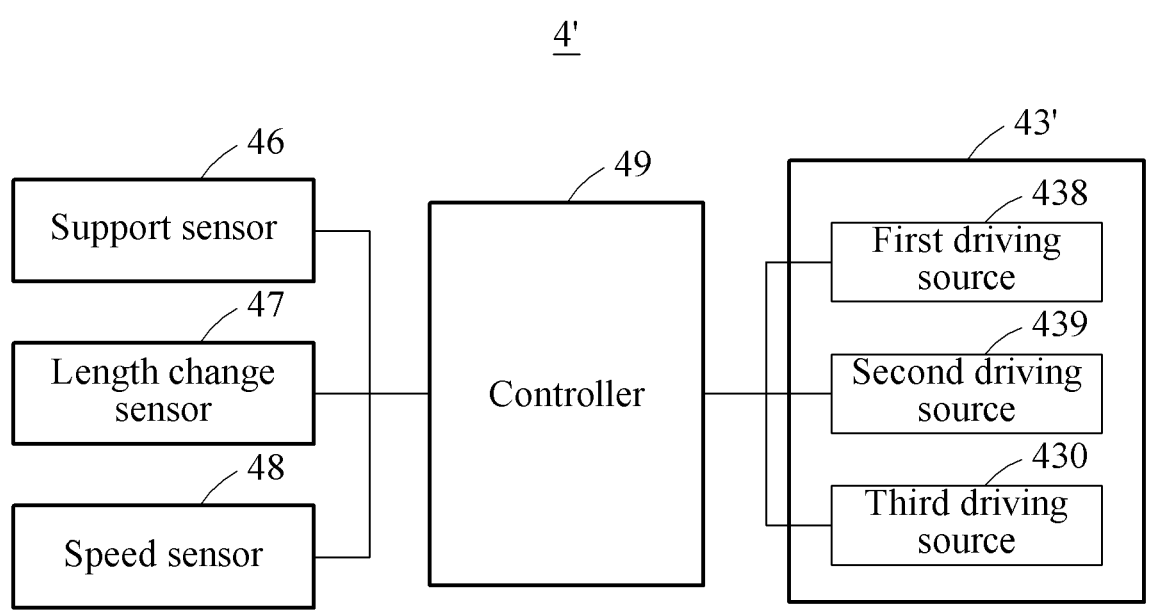
FIG. 9B is a block diagram illustrating a motion assistance apparatus according to at least one example embodiment.

FIG. 7 illustrates a motion assistance apparatus according to at least one example embodiment, FIG. 8 illustrates a support sensor according to at least one example embodiment, FIGS. 9A and 9B are block diagrams illustrating a motion assistance apparatus according to at least one example embodiment, and FIG. 10 is a flowchart illustrating a control method of a motion assistance apparatus according to at least one example embodiment.

Referring to FIGS. 7 through 10, a motion assistance apparatus 4 may include a proximal support 41 to support a proximal part of a user, a distal support 42 to support a distal part of the user, a support assembly 43, a controller 49, and a support sensor 46. The distal support 42 may include a first portion 421 and a second portion 422.

The support assembly 43 may connect the proximal support 41 and the distal support 42, and adjust a rotation angle of the distal support 42 and a separation distance between the proximal support 41 and the distal support 42.

The support assembly 43 may include a plurality of rotatable links. The support assembly 43 may include a first link 436, a second link 437, a first joint J1, a second joint J2, a third joint J3, a first driving source 438, and a second driving source 439.

The first link 436 may be rotatably connected to the proximal support 41. For example, the first link 436 may be rotatably connected to the first joint J1 disposed on a hip-joint covering portion of the proximal support 41. The first joint J1 may include a rotary axis that is similar or identical to a flexion or extension axis of a hip joint of the user. However, a location of the first joint J1 is not limited to the foregoing example.

The second link 437 may be rotatably connected to the first link 436 via the second joint J2 at one end. For example, the second joint J2 may include an axis that is similar or identical to a flexion or extension axis of a knee joint of the user. However, a location of the second joint J2 is not limited to the foregoing example.

The second link 437 may be rotatably connected to the distal support 42 via the third joint J3 at the other end. For example, the third joint J3 may include an axis that is similar or identical to a dorsiflexion or plantar flexion axis of an ankle joint of the user. However, a location of the third joint J3 is not limited to the foregoing example.

Referring to FIG. 9A, the first driving source 438 may adjust a rotation angle between the proximal support 41 and the first link 436, or a rotation angle between the first link 436 and the second link 437. That is, the first driving source 438 may be connected to one of the first joint J1 and the second joint J2 to rotate the connected one. For example, the first driving source 438 may rotate the first joint J1 or the second joint J2 to adjust a separation distance between the proximal support 41 and the distal support 42. The first driving source 438 may adjust a force transmitted from the third joint J3 to the distal support 42. When a lower limb supported by the support assembly 43 is in a stance phase, the first driving source 438 may rotate the first joint J1 or the second joint J2 to increase the separation distance between the proximal support 41 and the distal support 42, thereby providing an assistance power for supporting a weight of the user.

The second driving source 439 may adjust a rotation angle between the second link 437 and the distal support 42. For example, the second driving source 439 may rotate the third joint J3 to adjust a rotation angle of the distal support 42. The second driving source 439 may adjust a torque transmitted from the third joint J3 to each of the first portion 421 and the second portion 422 of the distal support 42. When the user is in a push-off interval, the second driving source 439 may rotate the third joint J3 such that the distal support 42 rotates in a clockwise direction in the example of FIG. 7. Through this, the second driving source 439 may provide an assistance power in a direction in which the second portion 422 of the distal support 42 pushes the ground. Also, in an interval in which the user performs a heel-strike motion, the second driving source 439 may rotate the third joint J3 such that the distal support 42 rotates in a counterclockwise direction in the example of FIG. 7. Through this, the second driving source 439 may provide an assistance power in a direction in which the first portion 421 of the distal support 42 pushes the ground so as to reduce an impact to be applied to the user.

Referring to FIG. 9B, a support assembly 43' may further include a third driving source 430. When the first driving source 438 rotates the first joint J1, the third driving source 430 may rotate the second joint J2. In this example, the first driving source 438 may adjust a rotation angle between the proximal support 41 and the first link 436, and the third driving source 430 may adjust a rotation angle between the first link 436 and the second link 437. When the first driving source 438 rotates the second joint J2, the third driving source 430 may rotate the first joint J1. In this example, the first driving source 438 rotates a rotation angle between the first link 436 and the second link 437, and the third driving source 430 may adjust a rotation angle between the proximal support 41 and the first link 436. Likewise, the support assembly 43' may include three driving sources to rotate three joints. As such, example embodiments are also applicable to a motion assistance apparatus including three driving sources respectively configured to drive the three joints.

The support sensor 46 may sense whether the distal support 42 contacts a ground and/or sense a pressure applied to the distal support 42. For example, the support sensor 46 may sense whether the first portion 421 of the distal support 42 contacts the ground or whether the second portion 422 of the distal support 42 contacts the ground. The support sensor 46 may include a first contact sensor 461 and a second contact sensor 462.

The first contact sensor 461 may transfer an on/off signal to the controller 49 based on whether the first portion 421 of the distal support 42 contacts the ground. The second contact sensor 462 may transfer an on/off signal to the controller 49 based on whether the second portion 422 of the distal support 42 contacts the ground.

The controller 49 may include a memory and processing circuitry (not shown)

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processing circuitry may include a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design and/or execution of computer readable instructions stored in the memory, as a special purpose computer to control the support assembly 43 based on signals received from the one or more sensors 46-48.

For example, as discussed below, the processing circuitry may be configured to calculate an elastic force of a first virtual spring S1 and a second virtual spring S2 using a virtual dual spring-mass model based on a modulus of elasticity of the first virtual spring S1, a length of the first virtual spring S1, a modulus of elasticity of the second virtual spring S2, and a length of the second virtual spring S2, and drive the support assembly 13 based on the elastic force of the first virtual spring S1 and the second virtual spring S2. Further, as discussed in more detail below, the processing circuitry may be configured to adjust the modulus of elasticities of the first and second virtual springs S1, S2 based on gait state of the user.

The controller 49 may control the support assembly 43 based on a virtual dual spring-mass model. The virtual dual spring-mass model may include a first virtual spring S1 and a second virtual spring S2. The first virtual spring S1 may connect the proximal support 41 and the first portion 421 of the distal support 42. The second virtual spring S2 may connect the proximal support 41 and the second portion 422 of the distal support 42. Also, the virtual dual spring-mass model may be a virtual model designed using the proximal support 41 as a body of mass.

The first virtual spring S1 may be a virtual spring configured to connect the first joint J1 and the first portion 421 of the distal support 42. The second virtual spring S2 may be a virtual spring configured to connect the first joint J1 and the second portion 422 of the distal support 42.

For example, the controller 49 may calculate an elastic force of the first virtual spring S1 based on a dual spring-mass model in response to a change in distance between the first portion 421 and the first joint J1 as if a length of the first virtual spring S1 is changed. The controller 49 may control the support assembly 43 based on the calculated elastic force.

The controller 49 may drive the support assembly 13 based on a modulus of elasticity of the first virtual spring S1, a change in length of the first virtual spring S1, a modulus of elasticity of the second virtual spring S2, and a change in length of the second virtual spring S2.

The modulus of elasticity of each of the first virtual spring S1 and the second virtual spring S2 may be a constant or non-linearly variable. When the motion assistance apparatus 4 is to assist a relatively simple gait pattern of a user, the modulus of elasticity of each of the first virtual spring S1 and the second virtual spring S2 may be set to be the constant. The constant value of the modulus of elasticity of each of the first virtual spring S1 and the second virtual spring S2 may be set based on an empirical study. Also, when the motion assistance apparatus 4 is to assist a relatively complex and delicate gait pattern of the user, the modulus of elasticity of each of the first virtual spring S1 and the second virtual spring S2 may be set to linearly change based on, for example, a gait status of the user. The linear modulus of elasticity of each of the first virtual spring S1 and the second virtual spring S2 may be set based on an empirical study.

The controller 49 may calculate the length of the first virtual spring S1 using, for example, a length of the first link 436, a length of the second link 437, a length between the third joint J3 and the first portion 421, an angle between the first link 436 and the second link 437, and an angle between the second link 437 and the distal support 42.

The controller 49 may determine a first virtual force applied from the first virtual spring S1 to the first portion 421 of the distal support 42 based on the change in length of the first virtual spring S1 and the modulus of elasticity of the first virtual spring S1.

The controller 49 may calculate the length of the second virtual spring S2 using, for example, the length of the first link 436, the length of the second link 437, a length between the third joint J3 and the second portion 422, and the angle between the first link 436 and the second link 437, and the angle between the second link 437 and the distal support 42.

The controller 49 may determine a second virtual force applied from the second virtual spring S2 to the second portion 422 of the distal support 42 based on the change in length of the second virtual spring S2 and the modulus of elasticity of the second virtual spring S2.

The controller 49 may control the first driving source 438 and the second driving source 439 based on an output matrix that is obtained by multiplying an input matrix by a Jacobian transformation matrix determined based on a kinematic structure of the support assembly 43. In this example, the input matrix may include the first virtual force and the second virtual force calculated using the virtual dual spring-mass model. The Jacobian transformation matrix may be, for example, a Jacobian transformation matrix determined based on a relationship between the first joint J1 and the first portion 421 of the distal support 42 and a relationship between the first joint J1 and the second portion 422 of the distal support 42. As illustrated in FIG. 7, when the support assembly 43 includes a plurality of joints, elements of the output matrix may be torques to be output by the first driving source 438 and the second driving source 439.

When a motion assistance apparatus 4' further includes the third driving source 430, the controller 49 may control the first driving source 438, the second driving source 439, and the third driving source 430 based on the output matrix that is calculated by multiplying the Jacobian transformation matrix, which is determined based on the kinematic structure of the support assembly 43, by each of the first virtual force and the second virtual force calculated using the virtual dual spring-mass model.

The controller 49 may adjust the modulus of elasticity of the first virtual spring S1 or the modulus of elasticity of the second virtual spring S2 based on information sensed in the support sensor 46.

When the first contact sensor 461 is on and the second contact sensor 462 is off, the controller 49 may adjust the modulus of elasticity of the first virtual spring S1 to be greater than the modulus of elasticity of the second virtual spring S2. In this example, the controller 49 may drive the support assembly 43 to assist a heel-strike motion of the user.

When the first contact sensor 461 is off and the second contact sensor 462 is on, the controller 49 may adjust the modulus of elasticity of the second virtual spring S2 to be greater than the modulus of elasticity of the first virtual spring S1. In this example, the controller 49 may drive the support assembly 43 to assist a push-off motion of the user.

When the first contact sensor 461 and the second contact sensor 462 are on, the controller 49 may adjust a difference in modulus of elasticity between the first virtual spring S1 and the second virtual spring S2 to be less than or equal to a first setting value. For example, as illustrated in FIG. 1, when the user is in a mid-stance interval of a gait cycle, the controller 49 may set the modulus of elasticity of the first virtual spring S1 and the modulus of elasticity of the second virtual spring S2 to be the same value. For example, the first setting value may be zero. Through this, from a heel-strike interval to a push-off interval, the motion assistance apparatus 4 may provide a natural assistance force to the user while the user is walking.

When the first contact sensor 461 and the second contact sensor 462 are off, the controller 49 may adjust the modulus of elasticity of each of the first virtual spring S1 and the second virtual spring S2 to be less than a second setting value. For example, when the first portion 421 and the second portion 422 are not in contact with the ground, the controller 49 may set the modulus of elasticity of the first virtual spring S1 and the modulus of elasticity of the second virtual spring S2 to be zero. In this example, during a swing phase, the controller 49 may prevent exertion of an unnecessary weight on the user, thereby improving a wearability.

Also, the support sensor 46 may include a pressure sensor to measure information on a distribution of a pressure applied from the ground to the distal support 42. In this example, the controller 49 may consecutively adjust the modulus of elasticity of the first virtual spring S1 and the modulus of elasticity of the second virtual spring S2 or a ratio between the modulus of elasticity of the first virtual spring S1 and the modulus of elasticity of the second virtual spring S2 based on the information measured by the pressure sensor.

The motion assistance apparatus 4 may include a length change sensor 47 and a speed sensor 48.

The length change sensor 47 may sense a change in length of the first virtual spring S1 and a change in length of the second virtual spring S2. The length change sensor 47 may vary based on a structure of the support assembly 43. In the example of FIG. 7, the length change sensor 47 may include an encoder to measure an angle of each joint based on the support assembly 43. The controller 49 may sense the change in length of the first virtual spring S1 and the change in length of the second virtual spring S2 based on a length of each link and the value measured in the encoder. In an example of a support assembly 63 of FIG. 12, the length change sensor 47 may include a location sensor configured to sense a change in length of each linear driver. In this example, a controller may sense changes in lengths of the first virtual spring S1 and the second virtual spring S2 based on information acquired by the location sensor. However, a type of the length change sensor 47 is not limited to the foregoing examples.

The speed sensor 48 may sense a walking speed of a user. The speed sensor 48 may include, for example, an inertial measurement unit (IMU) configured to be attached to a body of the user. The speed sensor 48 may sense the walking speed of the user based on information sensed by the IMU. Also, the speed sensor 48 may vary based on a structure of the support assembly 43. The speed sensor 48 may include an encoder to measure an angle of each joint based on the support assembly 43 in the example of FIG. 7. The controller 49 may sense the walking speed of the user based on a length of each link and a value measured by the encoder.

Referring to FIG. 10, the motion assistance apparatus may execute a control method.

In operation 91, the controller 49 may sense a state of the motion assistance apparatus. For example, in operation 91, the controller 49 may sense ground contact information of the distal support 42 through the support sensor 46 and sense a change in length between the proximal support 41 and the distal support 42 through the length change sensor 47.

In operation 92, the controller 49 may determine states of the first virtual spring S1 and the second virtual spring S2 based on a dual spring-mass model. For example, the controller 49 may determine states of the first virtual spring S1 and the second virtual spring S2 based on information sensed using the dual spring-mass model.

In operation 93, the controller 49 may determine output of the first driving source 438 and the second driving source 439. Alternatively, when the motion assistance apparatus 4' includes the third driving source 430, in operation 93, the controller 49 may determine outputs of the first driving source 438, the second driving source 439, and the third driving source 430.

In operation 94, the controller 49 may control the first driving source 438 and the second driving source 439. Alternatively, when the motion assistance apparatus 4' includes the third driving source 430, in operation 94, the controller 49 may control the first driving source 438, the second driving source 439, and the third driving source 430.

For example, when a walking speed sensed by the speed sensor 48 increases, the controller 49 may increase at least one of a modulus of elasticity of the first virtual spring S1 and a modulus of elasticity of the second virtual spring S2. Likewise, when the walking speed decreases, the controller 49 may reduce at least one of the modulus of elasticity of the first virtual spring S1 and the modulus of elasticity of the second virtual spring S2. Through this, the motion assistance apparatus 4 may imitate a gait of a person performing a motion similarly to a spring during a low-speed gait and performing a motion similarly to a rigid body, so as to improve a wearability for the user.

Further, in other example embodiments, when the motion assistance apparatus 2, 3 or 5, which include one or more dampers associated with each of the legs, is controlled by the controller 49, the controller may control the one or more dampers based on the walking speed sensed by the speed sensor 48. For example, the controller 49 may determine whether the user is walking at a low speed (e.g., a speed between 2.2 and 5.4 kilometers per hour (km/h)) or a high speed (e.g., a speed between 5.4 and 13 km/h) based on data received from the speed sensor 48, and may set the one or more dampers such that the corresponding springs have are relatively flexible structure if the user is walking with the low speed, and have a relatively more rigid structure if the user is walking with the high speed.

Figure 11:
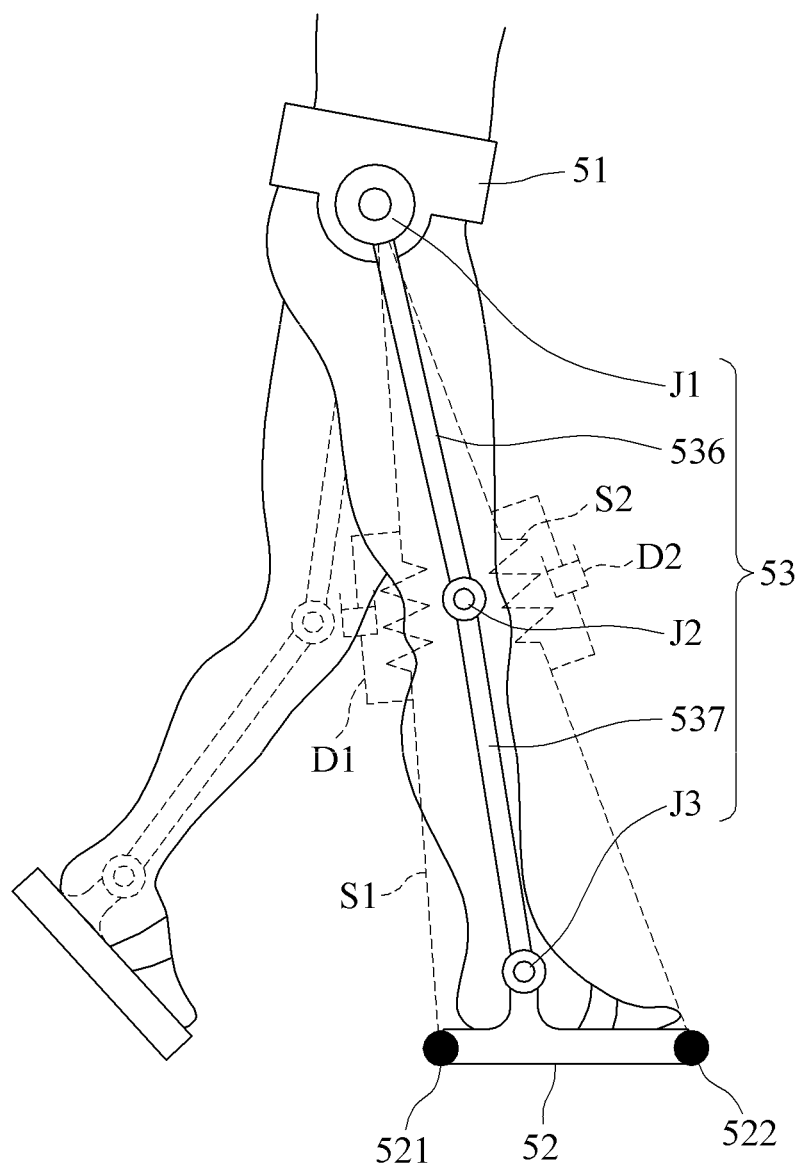
FIG. 11 illustrates a motion assistance apparatus according to at least one example embodiment.

FIG. 11 illustrates a motion assistance apparatus according to at least one example embodiment.

Referring to FIG. 11, a motion assistance apparatus 5 may include a proximal support 51, a distal support 52, a support assembly 53, and a controller (not shown). The support assembly 53 may include a first link 536, a second link 537, a first joint J1, a second joint J2, and a third joint J3.

The controller may control the support assembly 53 based on elastic forces of the first virtual spring S1 and the second virtual spring S2 and damping forces of the first damper D1 and the second virtual damper D2. The first damper D1 may be, for example, a virtual damper configured to connect the proximal support 51 and a first portion 521 of the distal support 52. The second damper D2 may be, for example, a virtual damper configured to connect the proximal support 51 and a second portion 522 of the distal support 52.

Figure 12:
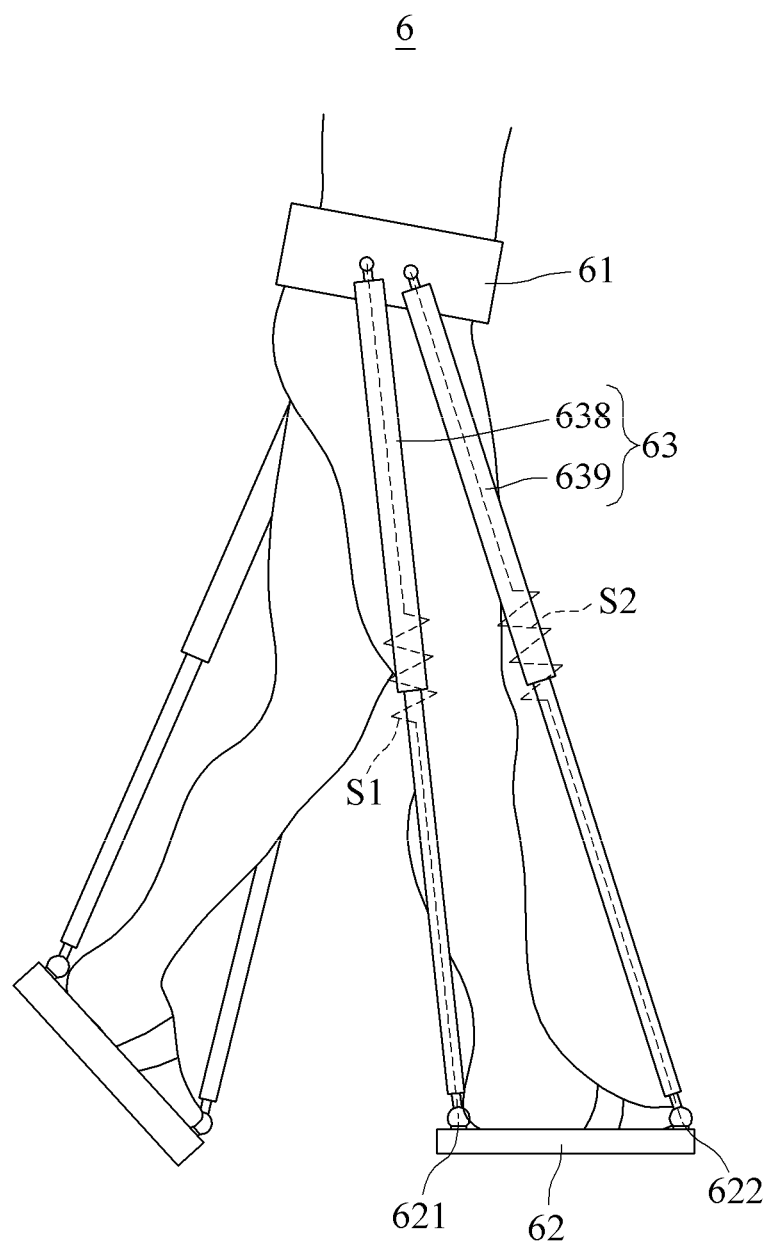
FIG. 12 illustrates a motion assistance apparatus according to at least one example embodiment.

FIG. 12 illustrates a motion assistance apparatus according to at least one example embodiment.

Referring to FIG. 12, a motion assistance apparatus 6 may include a proximal support 61, a distal support 62, the support assembly 63, and a controller (not shown).

The support assembly 63 may connect the proximal support 61 and both ends of the distal support 62. Also, the support assembly 63 may include a first driving source 638 and a second driving source 639 to provide linear power from the proximal support 61 to both ends of the distal support 62. The first driving source 638 and the second driving source 639 may be, for example, a piston-cylinder type linear driver.

The controller may determine a first virtual force exerted by the first virtual spring S1 on a first portion 621 of the distal support 62 and a second virtual force exerted by the second virtual spring S2 on a second portion 622 of the distal support 62. Also, the controller may control the first driving source 638 and the second driving source 639 based on an output matrix calculated by multiplying the first virtual force and the second virtual force by a Jacobian transformation matrix. Here, the Jacobian transformation matrix may be determined based on a kinematic structure of the support assembly 63. As illustrated in FIG. 12, when the support assembly 63 includes a plurality of linear drivers, elements of the output matrix may each be a force to be output from the first driving source 638 and the second driving source 639.

When the first driving source 638 and the second driving source 639 are provided at the same position as the first virtual spring S1 and the second virtual spring S2 in the distal support 62, the controller may control the first driving source 638 and the second driving source 639 to be driven using the first virtual force and the second virtual force.

Figure 13:
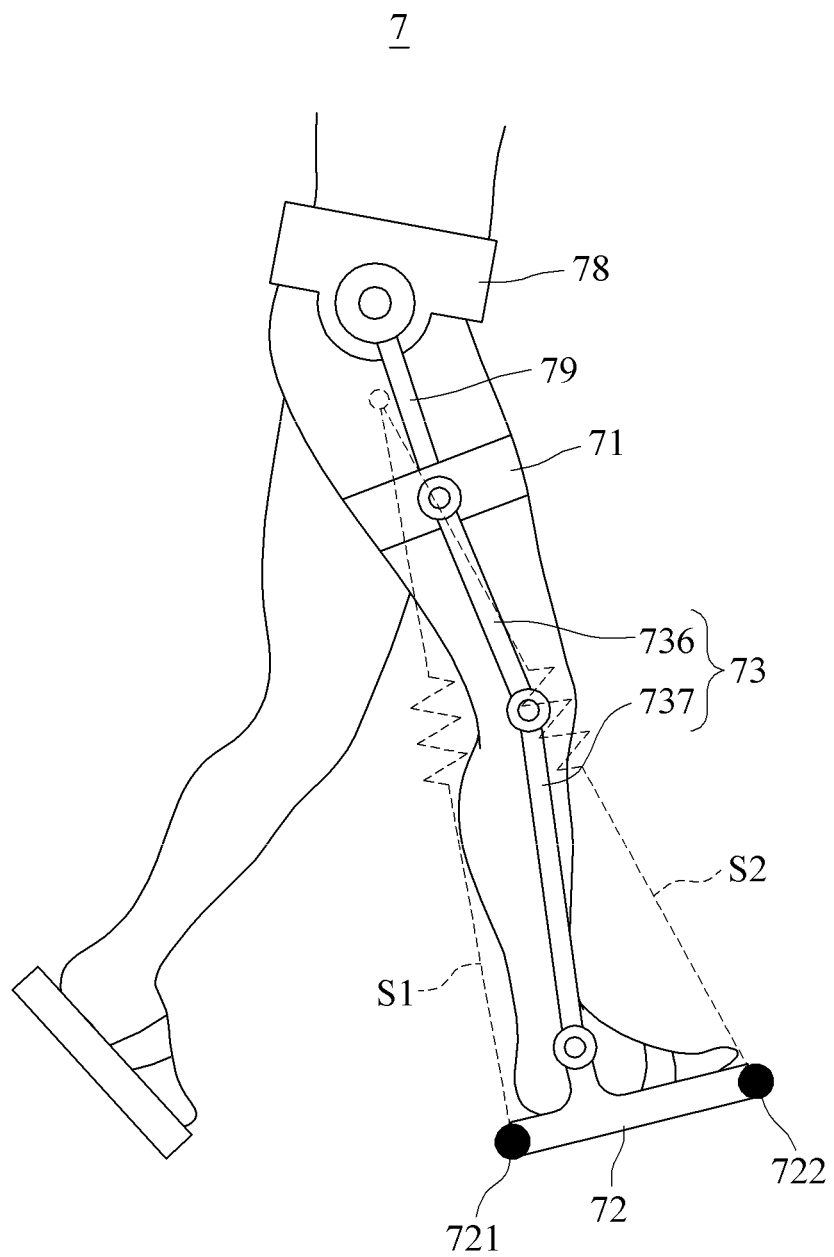
FIG. 13 illustrates a motion assistance apparatus according to at least one example embodiment.

FIG. 13 illustrates a motion assistance apparatus according to at least one example embodiment.

Referring to FIG. 13, a motion assistance apparatus 7 may include a proximal support 71, a distal support 72, a support assembly 73, a fixing member 78, and a connecting member 79. For example, the proximal support 71 may support a thigh. In this example, the fixing member 78 may be provided to prevent the proximal support 71 from slipping down.

The fixing member 78 may support a body part located opposite to a distal part of the user based on a proximal part. In this example, the proximal part may be supported by the proximal support 71 and the distal part may be supported by the distal support 72. For example, when the proximal support 71 and the distal support 72 respectively support a thigh and a foot of the user, the fixing member 78 may support a waist of the user.

The connecting member 79 may connect the fixing member 78 and the proximal support 71. The connecting member 79 may be a longitudinal member configured to extend from the fixing member 78 to the proximal support 71. For example, the connecting member 79 may be a frame as illustrated in FIG. 13. Also, the connecting member 79 may be a member such as a wire and a rubber string. The fixing member 78 and the connecting member 79 may prevent the proximal support 71 from separating from the proximal part of the user such that the motion assistance apparatus 7 stably assists a motion of the user while the user is walking.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion assistance apparatus comprising:
   a proximal support configured to support a proximal part of a user;
   a distal support configured to support a distal part of the user, the distal support including a first portion and a second portion;
   a support assembly configured to connect the proximal support and the distal support, to adjust a separation distance between the proximal support and the distal support, and to adjust a rotation angle of the distal support; and
   a controller configured to control the support assembly based on a virtual dual spring-mass model designed using the proximal support as a body of mass, the virtual dual spring-mass model including a first virtual spring virtually connecting the proximal support and the first portion of the distal support and a second virtual spring virtually connecting the proximal support and the second portion of the distal support.

2. The motion assistance apparatus of claim 1, wherein the first portion and the second portion of the distal support are on opposite sides of the distal support with respect to a center of rotation of the distal support.

3. The motion assistance apparatus of claim 1, wherein at least two joints are between the proximal part and the distal part of the user.

4. The motion assistance apparatus of claim 1, wherein the controller is configured to drive the support assembly based on a modulus of elasticity of the first virtual spring, a change in length of the first virtual spring, a modulus of elasticity of the second virtual spring, and a change in length of the second virtual spring.

5. The motion assistance apparatus of claim 1, wherein the controller is configured to,
    determine a first virtual force applied from the first virtual spring to the first portion of the distal support,
    determine a second virtual force applied from the second virtual spring to the second portion of the distal support, and
    drive the support assembly based on the first virtual force and the second virtual force.

6. The motion assistance apparatus of claim 1, wherein the controller is configured to adjust a modulus of elasticity of the first virtual spring and a modulus of elasticity of the second virtual spring.

7. The motion assistance apparatus of claim 6, wherein the controller is configured to,
    increase the modulus of elasticity of the first virtual spring when the first portion of the distal support contacts a ground, and
    reduce the modulus of elasticity of the first virtual spring when the first portion of the distal support separates from a ground.

8. The motion assistance apparatus of claim 6, further comprising:
    a support sensor configured to sense whether one or more of the first portion and the second portion of the distal support contacts a ground, wherein
    the controller is configured to adjust one or more of the modulus of elasticity of the first virtual spring and the modulus of elasticity of the second virtual spring based on one or more signals from the support sensor.

9. The motion assistance apparatus of claim 8, wherein the support sensor includes:
    a first contact sensor configured to transfer a first signal to the controller based on whether the first portion of the distal support contacts the ground; and
    a second contact sensor configured to transfer a second signal to the controller based on whether the second portion of the distal support contacts the ground.

10. The motion assistance apparatus of claim 9, wherein the controller is configured to,
    set the modulus of elasticity of the first virtual spring to a value greater than the modulus of elasticity of the second virtual spring when the first contact sensor is on and the second contact sensor is off, and
    set the modulus of elasticity of the second virtual spring to a value greater than the modulus of elasticity of the first virtual spring when the second contact sensor is on and the first contact sensor is off.

11. The motion assistance apparatus of claim 9, wherein the controller is configured to set a difference between the modulus of elasticity of the first virtual spring and the modulus of elasticity of the second virtual spring to a value less than or equal to a first set value, when both the first contact sensor and the second contact sensor are on.

12. The motion assistance apparatus of claim 9, wherein the controller is configured to set each of the modulus of elasticity of the first virtual spring and the modulus of elasticity of the second virtual spring to a value less than a second set value, when both the first contact sensor and the second contact sensor are off.

13. The motion assistance apparatus of claim 8, wherein the support sensor includes a pressure sensor configured to measure information on a distribution of pressure applied from the ground to the distal support, and the controller is configured to adjust values of the modulus of elasticity of the first virtual spring and the modulus of elasticity of the second virtual spring or a ratio between the modulus of elasticity of the first virtual spring and the modulus of elasticity of the second virtual spring based on the information.

14. The motion assistance apparatus of claim 1, further comprising:
    a speed sensor configured to sense a walking speed of the user, wherein the controller is configured to,
    increase at least one of a modulus of elasticity of the first virtual spring and a modulus of elasticity of the second virtual spring when the walking speed increases, and
    reduce at least one of the modulus of elasticity of the first virtual spring and the modulus of elasticity of the second virtual spring when the walking speed decreases.

15. The motion assistance apparatus of claim 1, wherein the virtual dual spring-mass model includes at least one of a first virtual damper and a second virtual damper, the first virtual damper connecting the proximal support and the first portion of the distal support, and the second virtual damper connecting the proximal support and the second portion of the distal support, and the controller is configured to control the support assembly based on a virtual damping force of the first virtual damper or the second virtual damper.

16. The motion assistance apparatus of claim 1, wherein the support assembly comprises:
    a plurality of rotatable links, a first driving source and a second driving source, wherein
    the plurality of rotatable links include a first link and a second link, the first link rotatably connected to the proximal support, and the second link rotatably connected to the first link and the distal support,
    the first driving source is configured to adjust a rotation angle between the proximal support and the first link or a rotation angle between the first link and the second link, and
    the second driving source is configured to adjust a rotation angle between the second link and the distal support.

17. The motion assistance apparatus of claim 16, wherein the controller is configured to,
    determine a first virtual force exerted by the first virtual spring on the first portion of the distal support and a second virtual force exerted by the second virtual spring on the second portion of the distal support, and
    control the first driving source and the second driving source based on an output matrix calculated by multiplying an input matrix by a Jacobian transformation matrix, the input matrix including the first virtual force and the second virtual force, and the Jacobian transformation matrix determined based on a kinematic structure of the support assembly.

18. The motion assistance apparatus of claim 16, wherein the support assembly further includes a third driving source configured to adjust the rotation angle between the first link and the second link, and
    the first driving source is configured to adjust the rotation angle between the proximal support and the first link.

19. The motion assistance apparatus of claim 1, wherein the support assembly includes a first driving source and a second driving source to connect both sides of the distal support and the proximal support, and to provide linear power from the proximal support to both sides of the distal support.

20. The motion assistance apparatus of claim 19, wherein the controller is configured to, determine a first virtual force exerted by the first virtual spring on the first portion of the distal support and a second virtual force exerted by the second virtual spring on the second portion of the distal support; and control the first driving source and the second driving source based on an output matrix calculated by multiplying an input matrix by a Jacobian transformation matrix, the input matrix including the first virtual force and the second virtual force, and the Jacobian transformation matrix determined based on a kinematic structure of the support assembly.

21. The motion assistance apparatus of claim 1, wherein the support assembly further comprises:

a damper configured to connect the proximal support and the distal support.

22. The motion assistance apparatus of claim 1, wherein the proximal support is configured to support a waist of the user, and the distal support is configured to support a first foot of the user.

23. The motion assistance apparatus of claim 22, further comprising:

an additional distal support configured to support a second foot of the user; and an additional support assembly configured to connect the proximal support and the additional distal support, and to adjust a separation distance from the proximal support to the additional distal support and a rotation angle of the additional distal support.

24. The motion assistance apparatus of claim 23, wherein the controller is configured to control the support assembly based on a virtual dual spring-mass model designed using the proximal support as a body of mass, the virtual dual spring-mass model including a first virtual spring and a second virtual spring, the first virtual spring configured to connect the proximal support and a first portion of the distal support, and the second virtual spring configured to connect the proximal support and a second portion of the distal support.

25. A method of controlling a motion assistance apparatus, the motion assistance apparatus including a proximal support configured to support a proximal part of a user and a distal support configured to support a distal part of the user, the method comprising:

adjusting a separation distance between the proximal support and the distal support and a rotation angle of the distal support based on a virtual dual spring-mass model designed using the proximal support as a body of mass, the virtual dual spring-mass model including a first virtual spring configured to connect the proximal support and a first portion of the distal support and a second virtual spring configured to connect the proximal support and a second portion of the distal support.

* * * * *